– – – – – – – –

United States Patent Office 3,705,163
Patented Dec. 5, 1972

3,705,163
PREPARATION OF 2-SUBSTITUTED QUINOLINES
David Horvitz and William D. Baugh, Cincinnati, Ohio, assignors to National Distillers and Chemical Corporation, New York, N.Y.
No Drawing. Filed May 19, 1969, Ser. No. 825,945
Int. Cl. C07d 33/18
U.S. Cl. 260—283 SY                16 Claims

ABSTRACT OF THE DISCLOSURE

A method is provided for the preparation of 2-substituted quinolines by the reaction of an aromatic nitro compound, such as nitrobenzene, with an olefin, such as ethylene or propylene, in the presence of a catalyst mixture of (A), a compound selected from the compounds of metals of Groups IV–A, IV–B, V–B and VII–B of the Periodic Table, and (B), a substance selected from the palladium-platinum triad metals of Group VIII of the Periodic Table and compounds thereof.

---

This invention is directed to a process for the preparation of 2-substituted quinolines, which can be substituted at other positions of the heterocyclic ring, as well as on the hydrocarbon ring.

The earliest method for preparing quinoline was the passage of allyl aniline vapors over litharge. The presently most commonly used syntheses for the preparation of quinoline and substituted quinolines are based upon the Doebner v. Miller synthesis, reacting an aromatic amine, unsubstituted in at least one position ortho to the amino group, e.g. aniline or its substituted derivatives, with a ring-forming compound containing a carbonyl group, e.g. aldehydes, ketones, acids or esters, or a compound which can generate a carbonyl group during the course of the reaction, e.g. polyols, such as glycerol and ethylene glycol, acetal, ethylene oxides and alcohols. The aromatic amine is reacted with an aldehyde in the presence of a strong acid, such as sulfuric acid or hydrochloric acid, to produce a substituted quinoline, such as 2-methylquinoline, i.e. quinaldine. The addition of zinc chloride improves the yield of quinaldine. Preferably, alpha, beta-unsaturated aldehydes are used, such as crotonic, tiglic or cinnamic aldehyde.

In a variation of the Doebner v. Miller synthesis, an equimolar mixture of an aldehyde and a methyl ketone can be reacted with the aromatic amine to form a 2,4-disubstituted quinoline. This reaction takes place in the presence of hydrogen chloride, and requires the initial ageing of the mixture of the ketone and the aldehyde in the presence of, for example, hydrogen chloride. A further variation of the Doebner v. Miller reaction comprises the reaction of aniline hydrochloride with acetone, optionally with phosphorus pentachloride or aluminum chloride as an initiator, to form 2,4-dimethylquinoline.

Perhaps the most common variation of the Doebner v. Miller synthesis is the Skraup synthesis, which provides for the production of quinoline or its benzene ring-substituted derivatives by the reaction of a substituted or unsubstituted aromatic amine with glycerine, sulfuric acid and an oxidizing agent. The oxidizing agent includes such compounds as arsenic pentoxide, m-nitrobenzene sulfonic acid, ferric salts, ortho-nitrophenol and chloropicrin. The most preferred oxidizing agent is an aromatic nitro compound which corresponds to the aromatic amine reactant and which is reduced to the amine and used for further reaction with the glycerine, e.g. nitrobenzene to aniline.

The production of quinoline from a mixture of aromatic amines, such as aniline, plus acetylene has also been considered in the presence of catalysts such as cupric chloride, zinc acetate and Al$_2$O$_3$. Quinoline can also be prepared from nitrophenols, such as nitrophenol, 2-nitro-4-chlorophenol and other substituted nitrophenols, by reaction with glycerine and sulfuric acid, to form the corresponding benzene ring-substituted quinoline compounds.

The reaction of the acetanilide with acetaldehyde in the presence of aqueous sodium hydroxide also yields quinoline. Reaction of ortho-toluidine with glyoxal in the presence of sodium hydroxide results in ring closure, and the formation of quinoline.

An extensive review of the various procedures employed for preparing quinoline and its derivatives is set forth in Heterocyclic Compounds, by R. C. Elderfield, vol. 4, "Quinoline, Isoquinoline and their Benzoderivatives," John Wiley and Sons, New York (1952), see particularly beginning with page 10. The preparation of quinoline from aniline and acetylene is set forth in Chem. Abstracts, 52, 8140 f. (1958).

Substituted quinolines are generally known compounds with a wide range of uses in the fields of dye manufacture and the manufacture of pharmaceuticals. Quinoline derivatives are used in dyes, medicines, amoebacides, mildew-proofing agents, perfumes, and as a source of nicotinic acid (Encyclopedia of Chemical Technology, R. E. Kirk and D. F. Othmer, Interscience Encyclopedia, Inc., New York, 1953, vol. 11 pages 396–7). Important dyes based particularly on 2-methylquinoline are Quinoline Yellow, photo-sensitizing cyanine dyes and polymethine dyes (ibid., vol. 5, page 347).

This invention provides a process for preparing 2-substituted quinoline compounds from economical and readily available reactants, eliminating the relatively expensive aniline, and substituting nitrobenzene. The nitrobenzene is reacted with an olefin, which can be obtained as a component of natural gas or as a by-product from petroleum refineries, in the presence of a catalyst, to form a 2-substituted quinoline.

In this reaction, a carbocyclic aromatic nitro compound, which is unsubstituted in at least one position ortho to the nitro group, i.e. contains a hydrogen atom at the ortho-position, is reacted with an alpha-olefin in the presence of a catalytic mixture of (A), a compound selected from the compounds of metals of Groups IV–A, IV–B, V–B, VI–B and VII–B of the Periodic Table, and (B), a substance selected from the palladium-platinum triad metals of Group VIII of the Periodic Table and compounds thereof, to form a 2-substituted quinoline, and water as a by-product.

The carbocyclic aromatic nitro compounds react with alpha-olefins as follows, using nitrobenzene as the aromatic nitro compound:

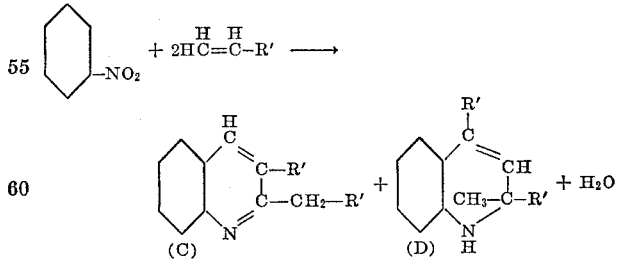

As shown, the olefin groups can react at either of two positions to form a heterocyclic ring with the nitrogen atom. Product (C) is a 2,3-di-substituted quinoline, but becomes 2-methylquinoline when R' is H. Product (D) is a 2,2,4-tri-substituted 1,2-dihydroquinoline. Where R' is H, i.e. the olefin is ethylene, the dihydroquinoline is not formed. When the reaction mixture contains two different olefins, containing different R groups, then a combination of corresponding derivatives is formed.

The R' group is shown attached at the 3-position in C and at the 4-position in D, and these are the major products. Minor amounts of products are obtained in which R' is substituted at the 4-position in C and at the 3-position in D.

The process of this invention is applicable to aromatic nitro compounds containing a single aromatic ring or two or more aromatic rings in which the rings are condensed or are separate but linked together in a ring-carbon to ring-carbon bond or by a bivalent nonaromatic bridging radical. Such polycarbocyclic aromatic compounds can have from two to ten rings, but there is no upper limit from the standpoint of operativeness of the reaction of this invention.

The aromatic nitro compounds which undergo this reaction can be represented generally as follows:

$$R_n-Ar-(NO_2)_m$$

Ar is an aromatic nucleus containing one or more aromatic rings, R is an inert substituent which has no effect on the reaction, $n$ can be from zero to four and defines the number of R groups attached to the Ar nucleus and $m$ is the number of nitro groups attached to the Ar nucleus. The ring carbon adjacent to at least one nitro group must have a replaceable hydrogen atom. If more than one nitro group is attached to a multi-ring Ar group, the nitro groups can be attached to the same or different rings.

The aromatic nucleus Ar of the aromatic nitro compounds of this invention include nitrobenzenes, nitronaphthalenes, nitro bisphenyl compounds and polyphenyl nitro compounds, such as the condensation products of methylol propane and nitro-substituted terphenyls, binaphthyls and quaternaphthyls.

Aromatic compounds which contain more than one nitro group each having an adjacent replaceable hydrogen on the aromatic ring, can react with two moles of an alpha-olefin for each nitro group to form as a product a compound having multiple condensed heterocyclic rings, e.g. a dinitrobenzene can form a pyrido-quinoline compound.

In addition to the nitro group there can also be attached to the aromatic nucleus one or more inert substituents that are not affected by and do not affect the reaction. Such groups include hydrocarbon groups, such as alkyl and cycloalkyl groups having from about 1 to about 20 carbon atoms, for example, methyl, ethyl, propyl, tert.-butyl, isooctyl, decyl, dodecyl, tetradecyl, cyclopentyl, and cyclohexyl, mixed alkyl aryl groups such as, for example, alkaryl groups having from 7 to about 20 carbon atoms, for example, alpha-phenethyl, benzyl and beta-phenethyl, aryl groups such as phenyl, naphthyl and diphenyl, alkoxy groups having from about 1 to about 20 carbon atoms, for example oxy-methyl, oxy-ethyl and oxy-tert.-butyl, aryloxy groups such as phenoxy or naphthoxy, aralkyloxy groups, alkaryloxy groups, carboxyl groups or carboxylic ester groups attached directly to the aromatic nucleus Ar or to the substituent groups, phenolic and alcoholic hydroxyl groups, halogen atoms, secondary and tertiary amino groups connected directly to the Ar nucleus or to an organic substituent, sulfhydryl groups and thioether groups, and nitrile groups.

Exemplary aromatic nitro compounds include nitrobenzene, p-nitrotoluene, m-nitrotoluene, o-nitrotoluene, p-chloronitrobenzene, m-bromonitrobenzene, o-fluoronitrobenzene, p-nitroanisole, m-nitrophenol, p-nitrobenzylcyanide, p-nitrocyanobenzene, p-nitrobenzoic acid, p-nitroethylbenzoate, p-dimethylaminonitrobenzene, m-di-nitrobenzene, 2,4-dinitrotoluene, 2-chlor-4-nitro, 1-nitronaphthalene, 2-nitronaphthalene, 2-nitro-anthracene, 1-nitro-8-chloronaphthalene, 5-hydroxy-2-nitronaphthalene, o-nitrodiphenyl and p-nitrodiphenyl. The nitro compounds can generally be prepared by direct nitration of the corresponding hydrocarbon with nitric acid, alone or in combination with acetic acid, acetic anhydride or sulfuric acid.

Generally, any alpha-olefin can be used having the formula $CH_2=CHR$, wherein R can be hydrogen or a hydrocarbon group containing from one to about twelve carbon atoms or a hydrocarbon group substituted by an inert substituent. Alpha-olefins are preferred and the highest yields are obtained using ethylene and propylene to prepare the corresponding 2-methyl quinoline and 2-ethyl-3-methyl quinoline (and isomers thereof), respectively.

The R groups can be aliphatic groups, such as methyl, ethyl, propyl, isopropyl, butyl, isobutyl, sec-butyl, tert.-butyl, amyl, hexyl, 2-ethyl butyl, isooctyl; cycloaliphatic groups, such as cyclohexyl, cyclopentyl; aromatic groups, such as phenyl or benzyl, or naphthyl; and such groups substituted with substituents inert to the present reaction (i.e. which do not enter into nor affect the course of the present reaction). Such substituents include halogen atoms, such as chlorine and bromine, and amino groups. Inertly-substituted ethylene and propylene can also be used in this reaction, e.g., vinyl chloride.

Useful olefinic compounds include ethylene, propylene, 1-butylene, vinyl chloride, 1-amylene, 1-heptene, 1-hexene, 1-decene, 3-ethyl-1-butylene, 4-methyl-1-pentene, 1-dodecene, 1-octene, 1-nonene, 3-chloro-1-butylene, 3-chloropropylene, styrene and methyl styrene.

The catalyst components must be mixed in the reactor. Neither of the catalyst components alone is effective in initiating and carrying out the desired reaction.

Catalyst A is a compound of a metal of Group IV-A, IV-B, V-B, VI-B, and VII-B of the Periodic Table. Catalyst A can be in the form of a salt, such as, for example, the halides, e.g. chloride, bromide, fluoride, and iodide, the oxyhalides, nitrates, sulfates or acetates; as the oxides; as the complex of the metal compound with an inorganic or organic complex or a chelate-forming compound such as the benzonitrile, acetylacetonate or the bis-π-aryl complexes, e.g. molybdenum bis(benzonitrile) chloride or molybdenum acetylacetonate. The catalyst may also be in the form of the compound or complex supported by an inert carrier, for example, carbon, alumina, such as sintered alumina spheres or activated alumina, silica or molecular sieves. Any of the metals of Groups IV-A, IV-B, V-B, VI-B, and VII-B of the Periodic Table can be employed including molybdenum, rhenium, tungsten, vanadium, titanium, tin, zirconium, tantalum, chromium, and manganese. Because of their ready availability and the excellent results which they produce, the molybdenum catalysts are preferred, particularly in the form of a halide, such as molybdenum pentachloride. Other exemplary catalysts are: $MoCl_5$, $MoCl_4$, $MoCl_3$, $MoO_2Cl_2$, $MoOCl_4$, $MoO_2$, $MoO_3$, $SnCl_4$, $TiCl_4$, $VCl_4$, $VOCl_2$, $VOSO_4$, $V_2O_5$, $ReCl_5$, $ReO_3$, $VOBr_2$, $MoI_3$.

Catalyst B is a platinum-palladium triad catalyst and is derived from any of the noble metals of Group VIII of the Periodic Table, otherwise known as the platinum-palladium triad. Catalyst B can also be employed in the form of a compound of these metals including the salts such as for example the chloride, bromide, fluoride, iodide, nitrate, sulfate or oxyhalide; or as the oxide; or as the elemental metal; as the complex of the metal or compound with an inorganic or organic complex or a chelate-forming compound such as referred to above with respect to catalyst A, or in the form of the metal, salt, oxide or complex supported on an inert carrier such as listed above for catalyst A.

The platinum-palladium triad includes platinum, palladium, ruthenium, rhodium, osmium and iridium. The palladium catalysts are readily available and relatively inexpensive and give excellent results in combination with catalyst A and are therefore preferred, particularly in the form of a halide such as palladous chloride and palladous bromide. Other examples of catalyst are listed above and in addition include palladous diacetate, palladous benzoate, platinic oxide ($PtO_2$), palladous oxide (PdO), palladous chloride ($PdCl_2$), palladium metal, platinum metal, the chlorides and bromides of rhodium ($RhCl_3$), ruthenium (RuCl$_3$), platinum (PtCl$_4$), iridium, (IrCl$_3$) and osmium (OsCl$_3$), rhodium metal, plattinous acetate, rhodium oxide, ruthenium oxide (RuO$_3$), palladous cyanide, potassium chloropalladite and palladous acetylacetonate.

Other compounds which are known to complex with the platinum-palladium triad metals can also be added as co-catalysts. Examples of such ligands include triphenyl phosphine, pyridine, benzonitrile and pentane-1,3-dione. Only small amounts of these additional ligands need be added, generally in the range from about 10 to about 500 mol percent based on the metal catalysts.

The olefin compound is preferably supplied in at least stoichiometric proportions, i.e. two moles per mole of the aromatic nitro compound. Optimally, the olefin compound is present in a molar excess of at least 50% greater than the stoichiometric quantity.

The amount of catalyst added is not critical and very small amounts are effective to bring about the reaction. If the reaction is carried out as a batch process in the liquid phase, i.e. at least the aromatic nitro compound is liquid, catalyst A is preferably present in an amount ranging from $1 \times 10^{-3}$ to $5 \times 10^{-1}$ mole per liter solution and optimally from $10^{-2}$ to $10^{-1}$ moles per liter. Catalyst B is preferably present in an amount ranging from about $1 \times 10^{-4}$ to $5 \times 10^{-1}$ mole per liter of solution and optimally from $10^{-3}$ to $10^{-1}$ mole per liter. The molar ratio of catalyst A to catalyst B for any reaction conditions is generally in the range of from about 100:1 to about 1:100 with the preferred range being about 10:1 to about 1:10. If the reaction is carried out as a continuous flow process in the liquid phase, the catalyst may be held in solution or as a dispersed solid in the range of concentrations specified above, or it may be held in insoluble form on a solid support, over which the reaction mixture flows. It is also held on a solid support for continuous gas phase reaction. The concentration of catalyst on the solid support may range from 0.1 weight percent of the support to 10 or more percent. A preferred range is 0.5 to 5% with the ratio of catalyst A to B in the range of 1:10 to 10:1. A supported catalyst is preferably used when carrying out the reaction as a continuous process in the gas phase.

The reaction can be carried out at from about one to about 200 atmospheres or even higher, with a preferred range of from about one to about 100 atmospheres pressure.

In carrying out the reaction, the aromatic nitro compound is preferably in the liquid phase and the olefin is a gas which is either bubbled through the liquid or formed as an atmosphere under pressure over the liquid. Under conditions where the aromatic nitro compound is a solid or a gas, it can be dissolved or dispersed in an inert diluent.

The reaction proceeds at temperatures within the range of from about 100° to about 250° C. At temperatures below 100° C., although the reaction will proceed, the rate can be unduly low. However, such low temperatures can be used if desired. The upper temperature limit is normally established by the decomposition temperatures of the reactants and the reaction products. In some cases, at the higher reaction temperatures and pressures, polymeric byproducts can be formed. The preferred reaction temperature is within the range from about 125° to about 175° C.

When the reaction is carried out in the liquid phase, the presence of a liquid diluent or carrier is optional if the aromatic nitro compound is liquid at the pressure and temperature of reaction. A diluent is preferred, however, as the reaction is exothermic and the diluent aids in dissipating the heat that is generated. Although any inert diluent can be used, those which are solvents for the reactants give the best results. Useful diluents include hydrocarbons, chlorinated hydrocarbons, alcohols and ethers. The generally useful diluents include benzene, toluene, xylene, chlorobenzene, dichlorobenzene, hexane, octane, cyclohexane, cyclopentane, petroleum ether, isohexane, isoheptane, 1,2-dichloroethane, methylene chloride, methanol, ethanol, diethyl ether, 1,2-dimethoxy ethane. The concentration of the olefin and aromatic nitro compound reactants in the solvent is not critical. However, the reactants preferably are present in an amount of from about 5 to about 50% by weight of the reaction mixture based upon the total amount of diluent and reactants.

The catalysts which can be maintained dispersed or in solution in the liquid phase of the reaction mixture or supported on an active solid support surface, are immediately separated from the reaction mixture at the conclusion of the reaction. Where a catalyst is not soluble in the substituted quinoline and dihydroquinoline product, it can be separated by centrifuging or filtration. The liquid reaction mixture can then be subjected to fractional distillation and the pure substituted quinoline or dihydroquinoline, if any is present, obtained. Any unreacted aromatic nitro compounds and the usually lower boiling olefin can be removed from the higher boiling products by fractional distillation, desirably at a reduced pressure to avoid any degradation of the product. Many of the methods of separation by distillation under vacuum or pressure or by selective extraction can also be practiced within the scope of this process.

The reaction is readily adapted to a continuous operation by blending catalyst and the aromatic nitro compound starting material together with any unreacted liquid material from a previous step and leading the blend to a reactor where it is put under pressure with the olefin reactant and held for a sufficient time to effect the reaction. Conveniently an elongated reactor can be used in which the traverse time for the reaction mixture is equal to the required reaction time. The catalyst can then be separated by filtration or centrifugal separation. The solvent and unreacted aromatic nitro compound recovered by distillation, and the quinoline reaction product purified in any desired manner. An insoluble catalyst supported on a fixed bed is preferred for continuous reaction.

The following examples in the opinion of the inventors represent preferred embodiments of our invention.

EXAMPLE 1

Nitrobenzene, 5 ml., chlorobenzene, 20 ml., molybdenum pentachloride, 0.3 g., and palladium chloride, (PdCl$_2$) 0.2 g., were placed in a glass-lined 250 ml. stainless steel pressure vessel. The vessel was sealed and pressurized with ethylene gas to 800 p.s.i.g. The reaction mitxure was then stirred while quickly heating to 150° C., at which it was maintained for 10 hours. At the end of this period, the reaction mixture was permitted to cool, the excess pressure vented and the system opened. The reaction mixture was filtered and the filtered solution was analyzed by gas chromatography. Substantially all of the nitrobenzene had been converted to 2-methylquinoline. A trace of 2-propylquinoline was also noted.

The 2-methylquinoline and 2-propylquinoline were separated from the solution by chromatography and their structure identified by mass spectrograph, nuclear magnetic resonance and infra-red spectroscopy.

The reaction was also repeated in a stainless steel vessel without a glass liner. The direct contact with stainless steel was found not to have any effect upon the reaction. The same products were obtained in the same yield.

EXAMPLE 2

Nitrobenzene, 5 ml., chlorobenzene, 20 ml., molybdenum pentachloride, 0.3 g., palladium chloride, 0.2 g. and liquid propylene, 12 ml. were placed in a 250 ml. pressure vessel. The pressure vessel was sealed and quickly heated to 150° C., at which it was maintained for eight hours with continuous stirring. At the end of this period, the heat was discontinued and the pressure vessel permitted to cool. The seal was broken and the liquid product filtered and centrifuged to remove any solid catalyst. The product was then analyzed by gas chromatography. Most of the nitrobenzene had been converted to a mixture of approximately equal amounts of 2-ethyl-3-methylquinoline and 2,2,4-trimethyl-1,2-dihydroquinoline. The identity of the products was determined by mass spectrograph and infra-red spectroscopy.

EXAMPLE 3

Nitrobenzene, 8 ml., ortho-dichlorobenzene, 30 ml., molybdenum pentachloride, 0.3 g., and palladium chloride ($PdCl_2$), 0.2 g. were placed in a 100 ml. glass reaction vessel equipped with a stirrer, gas inlet tube and water-cooled condenser. The contents of the vessel were heated to 150° C. with stirring while ethylene gas was bubbled through at a rate of 15 cc. per minute at atmospheric pressure. The vessel was maintained at 150° C. for 18 hours, after which time the ethylene gas bubbling was discontinued and the mixture permitted to cool. Upon analysis the reaction mixture was shown to contain a significant quantity of 2-methylquinoline.

EXAMPLE 4

Pellets of alumina (⅛-inch) were impregnated with an aqueous solution of molybdenum pentachloride and palladium dichloride. The pellets were dried; the dried pellets contained 5% by weight of each of the molybdenum pentachloride and palladinm dichloride components.

A bed of this catalyst, 12.7 cm. by 2 cm., was prepared in a glass reaction tube which was connected to a bubbler containing nitrobenzene at 140° C. Ethylene, at atmospheric pressure, was passed through the bubbler and the resulting gaseous mixture of ethylene and nitrobenzene from the bubbler was passed through the catalyst bed, which was maintained at 210° C. The effluent gases were condensed and found to contain 2-methylquinoline.

EXAMPLE 5

Nitrobenzene, 5 ml., methanol, 5 ml., chlorobenzene, 25 ml., molybdenum pentachloride, 0.3 g., and palladium dichloride, 0.2 g., were placed in a stainless steel reactor and sealed. The reactor was pressurized to 950 p.s.i.g. with ethylene gas, the mixture was then heated to 150° C. and maintained there for 7 hours with continuous stirring. A high yield of 2-methylquinoline was produced.

EXAMPLE 6

Nitrobenzene, 5 ml., chlorobenzene, 25 ml., molybdenum pentachloride, 0.3 g., and one gram of powdered alumina, containing 5% by weight of metallic palladium, were placed in a stainless steel pressure vessel and sealed. The vessel was pressurized with ethylene to 965 p.s.i.g. The vessel was then heated to 170 to 185° C., maintained in that range for 7 hours, with continuous stirring. A high yield of 2-methylquinoline was produced.

EXAMPLE 7

Nitrobenzene, 5 ml., chlorobenzene, 25 ml., rhenium pentachloride, 0.6 g., palladium dichloride, 0.2 g., were placed in a stainless steel pressure vessel, which was then sealed. The vessel was pressurized with ethylene to 900 p.s.i.g. and then heated to 150° C., with continuous stirring and maintained at that temperature for 10 hours. The reaction product contained 2-methylquinoline and a trace of 2-propylquinoline.

EXAMPLE 8

The reaction process of Example 7 was repeated but substituting tungsten hexachloride, 0.6 g., for the rhenium pentachloride. Approximately the same yield of 2-methylquinoline and a trace of 2-propylquinoline was obtained.

EXAMPLE 9

The reaction process of Example 7 was repeated but substituting vanadium oxydichloride, 0.2 g., for the rhenium pentachloride. Approximately the same yield of 2-methylquinoline and a trace of 2-propylquinoline was obtained.

EXAMPLE 10

The reaction process of Example 7 was repeated but substituting titanium tetrachloride, 0.15 g., for the rhenium pentachloride. Approximately the same yield of 2-methylquinoline and a trace of 2-propylquinoline was obtained.

EXAMPLE 11

The reaction process of Example 7 was repeated but substituting stannic chloride, 0.25 g., for the rhenium pentachloride. Approximately the same yield of 2-methylquinoline and a trace of 2-propylquinoline was obtained.

EXAMPLE 12

The reaction process of Example 7 was repeated but substituting molybdenum dioxydichloride, 0.1 g., for the rhenium pentachloride. Approximately the same yield of 2-methylquinoline and a trace of 2-propylquinoline was obtained.

EXAMPLE 13

The process according to Example 7 was repeated but substituting molybdenum dioxide, 0.2 g., for the rhenium pentachloride. Approximately the same yield of 2-methylquinoline with a trace of 2-propylquinoline was obtained.

EXAMPLE 14

The reaction of Example 7 was again repeated but substituting vanadium sulfate, 0.2 g., for the rhenium pentachloride. The same yield of 2-methylquinoline with a trace of 2-propylquinoline was obtained.

EXAMPLE 15

A mixture of p-nitrotoluene, 5 g., chlorobenzene, 25 ml., molybdenum pentachloride, 0.3 g., and palladium dichloride, 0.2 g., was placed in a stainless steel pressure vessel which was then sealed. The vessel was pressurized with ethylene to 975 p.s.i.g. and heated to 150° C. where it was maintained for 6 hours, with continuous stirring. The vessel was then permitted to cool and unsealed. The reaction product was found to contain a satisfactory yield of 2,6-dimethylquinoline.

EXAMPLE 16

Chlorobenzene, 25 ml., 1-chloro-4-nitrobenzene, 5 g., molybdenum pentachloride, 0.3 g., and palladium dichloride, 0.2 g., were placed in a stainless steel pressure vessel which was pressurized with ethylene to 950 p.s.i.g. The vessel was sealed then heated to 150° C. where it was maintained for 6 hours of continuous stirring. A high yield of 2-methyl-6-chloroquinoline was obtained.

EXAMPLE 17

Ortho-nitrotoluene, 5 ml., chlorobenzene, 25 ml., molybdenum pentachloride, 0.3 g., and palladium dichloride, 0.2 g., were placed in a stainless steel pressure vessel, which was then pressurized with ethylene to 975 p.s.i.g. The vessel was sealed and then heated to 148° C., at which it was maintained for 7 hours, with continuous stirring. The vessel was permitted to cool and then unsealed. The liquid reaction mixture was found to contain 2,8-dimethylquinoline in satisfactory yield.

EXAMPLE 18

Nitrobenzene, 5 ml., chlorobenzene, 25 ml., molybdenum pentachloride, 0.3 g., and ruthenium trichloride hydrate, 0.2 g., were placed in a stainless steel pressure vessel and pressurized with ethylene to 960 p.s.i.g. The vessel was sealed and heated to 165° C., where it was maintained for 7 hours with continuous stirring. The vessel was then permitted to cool and then unsealed. The liquid reaction mixture was found to contain 2-methylquinoline in good yield.

EXAMPLE 19

The process of Example 18 was repeated but rhodium chloride trihydrate (RhCl$_3 \cdot$3H$_2$O) was substituted for the ruthenium trichloride hydrate. A good yield of 2-methylquinoline was obtained.

EXAMPLE 20

The reaction of Example 18 was repeated but substituting platinum tetrachloride for the ruthenium trichloride hydrate. A good yield of 2-methylquinoline was obtained.

EXAMPLE 21

The process of Example 18 was repeated but substituting palladium diacetate for the ruthenium trichloride hydrate. A good yield of 2-methylquinoline was obtained.

EXAMPLE 22

The process of Example 2 is repeated but substituting 1-octene for the propylene. The liquid product contains 2-heptyl-3-hexyl in good yield.

EXAMPLE 23

The process of Example 1 is repeated but substituting para-dinitro benzene for the nitrobenzene used. The liquid product contains pyridoquinoline.

EXAMPLE 24

The process of Example 1 is repeated, but substituting 6-nitronaphthalene (also known as 2-nitronaphthalene) for nitrobenzene. The liquid product contains naphthylquinoline (also known as benzoquinoline) in good yield.

EXAMPLE 25

The process of Example 1 is repeated, but substituting p,p-dinitrodiphenyl:

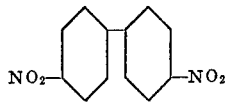

The liquid product contains bis(quinoline), in good yield.

Having regard to the foregoing disclosure, the following is claimed as the inventive and patentable embodiments thereof:

1. A process for preparing quinoline compounds comprising
    reacting a carbocyclic aromatic nitro compound having the formula R$_n$—Ar—(NO$_2$)$_m$, wherein Ar is a carbocyclic aromatic nucleus having one to four aromatic groups, R is selected from the group consisting of lower alkyl, cyclopentyl, cyclohexyl, lower alkoxy, phenoxy, naphthoxy, carboxy and its lower alkyl esters, hydroxy, halo, cyano and lower dialkylamino n is zero or a positive integer from one to four, and m is the number of nitro groups attached to the Ar nucleus and is one or two, and wherein the aromatic nucleus has at least one hydrogen atom ortho to each nitro group present; with an alpha-olefin compound, CH$_2$=CH—R', in which R is hydrogen or a group selected from alkyl having 1 to 4 carbon atoms, cyclopentyl, cyclohexyl, phenyl, benzyl and naphthyl, which group may have halide substituents;
    in the presence of a catalyst mixture of a catalytic amount of (A) a halide, oxide, oxyhalide, nitrate, sulfate or acetate of a metal of chromium, molybdenum or tungsten; and a catalytic amount of (B) a substance selected from the group consisting of ruthenium metal, rhodium metal, palladium metal, osmium metal, iridium metal and platinum metal and the halides, oxides, nitrates, sulfates, oxyhalides, benzoates or acetates of such metals; the catalytic materials (A) and (B) being present in the molar ratio of A:B of from 1:100 to 100:1; and
    recovering as the major products (1) a quinoline which is substituted in the 2-position by —CH$_2$—R' and in the 3-position by —R', and (2) a dihydroquinoline which is substituted in the 2-position by —CH$_3$ and —R' and in the 4-position by —R'.

2. A process in accordance with claim 1 in which the reaction is carried out at a pressure within the range from about 1 to about 200 atmospheres.

3. A process in accordance with claim 1 in which the reaction temperature is within the range from about 100° to 250° C.

4. A process in accordance with claim 1 in which the aromatic nitro compound is nitrobenzene.

5. A process in accordance with claim 1 in which the olefin is ethylene.

6. A process in accordance with claim 1 in which the olefin is propylene.

7. A process in accordance with claim 1 in which the aromatic nitro compound is in the liquid phase.

8. A process according to claim 1 in which the reaction is carried out in the presence of an inert organic liquid diluent.

9. The process according to claim 7 in which the olefin is in the vapor phase.

10. A process in accordance with claim 1 wherein the olefin and the aromatic nitro compound are in the vapor phase.

11. A process in accordance with claim 1 in which the olefin is present in a stoichiometric excess of at least 50 mol. percent.

12. A process in accordance with claim 11 in which the olefin is ethylene and the aromatic nitro compound is nitrobenzene.

13. A process in accordance with claim 11 in which the olefin is propylene and the aromatic nitro compound is nitrobenzene.

14. A process in accordance with claim 1 wherein catalytic material (A) is a halide and catalytic material (B) is a halide.

15. The process of claim 1 wherein the aromatic nucleus Ar is benzene, diphenyl, terphenyl, naphthalene, binaphthyl, or anthracene.

16. A process for preparing quinoline compounds comprising
    reacting a carbocyclic aromatic nitro compound selected from the group consisting of nitrobenzene, p-nitrotoluene, m-nitrotoluene, o-nitrotoluene, p-chloronitrobenzene, m-bromonitrobenzene, o-fluoronitrobenzene, p-nitroanisole, m-nitrophenol, p-nitrobenzylcyanide, p-nitrocyanobenzene, p-nitrobenzoic acid, p-nitroethylbenzoate, p-dimethylaminonitrobenzene, m-dinitrobenzene, 2,4-dinitrotoluene, 4-chloro-4-nitrotoluene, 1-nitronaphthalene, 2-nitronaphthalene, 2-nitro-anthracene, 1-nitro-8-chloronaphthalene, 5-hydroxy-2-nitronaphthalene, o-nitrodiphenyl, p-nitrodiphenyl, p-dinitrobenzene and p,p-dinitrodiphenyl; with an alpha-olefin compound selected from the group consisting of ethylene, propoylene, 1-butylene, vinylchloride, 1-amylene, 1-hexene, 3-ethyl-1-butylene, 4-methyl-1-pentene, 3-chloro-1-butylene, 3-chloropropylene, styrene and methyl styrene;
    in the presence of a catalyst mixture of a catalytic amount of (A) MoCl$_5$, MoCl$_4$, MoCl$_3$, MoO$_2$Cl$_2$, MoOCl$_4$, MoO$_2$, MoO$_3$, MoI$_3$, WCl$_6$, molybdenum bis(benzonitrile) chloride or molybdenum acetylacetonate; and a catalytic amount of (B) palladium metal, palladous chloride, palladous bromide, palladous diacetate, palladous benzoate, palladous oxide, palladous cyanide, potassium chloropalladite, palladous acetylacetonate, platinum metal, platinic oxide, platinum chloride, platinum bromide, platinous acetate, rhodium metal, rhodium chloride, rhodium bromide, rhodium oxide, ruthenium metal, ruthenium chloride, ruthenium oxide, iridium metal, iridium chloride, iridium bromide, osmium metal, osmium chloride or osmium bromide; the catalytic materials (A) and (B) being present in the molar ratio of $A:B$ of from 1:100 to 100:1; and recovering quinoline and dihydroquinoline compounds as the major products.

References Cited

UNITED STATES PATENTS

| | | | |
|---|---|---|---|
| 2,035,751 | 3/1936 | Kunz | 260—283 |
| 2,578,910 | 12/1951 | Uraneck | 260—288 X |
| 3,322,773 | 5/1967 | Ennis | 260—288 |
| 3,381,006 | 4/1968 | Suh | 260—326.16 X |
| 3,398,167 | 8/1968 | Mahler | 260—288 X |
| 3,426,026 | 2/1969 | Ennis et al. | 260—288 |
| 3,463,781 | 8/1969 | Bell | 260—283 X |

OTHER REFERENCES

Beilstein: Hauptwerke, p. 257, Syst. No. 465; Erg. I, p.135 and Erg. II, p. 193.

DONALD G. DAVIS, Primary Examiner

U.S. Cl. X.R.

252—431, 458, 469, 470, 471; 260—270 R, 283 R, 283 BI, 288 P, 429 R, 429 J